UNITED STATES PATENT OFFICE.

MAURICE G. OLIVIER, OF PARIS, FRANCE, ASSIGNOR TO SOCIETE FRANCAISE DE CRINS ARTIFICIELS, OF PARIS, FRANCE, A FRENCH CORPORATION.

METHOD OF PRODUCING MOLDED ARTICLES OF PURE CELLULOSE.

1,422,469. Specification of Letters Patent. Patented July 11, 1922.

No Drawing. Application filed March 31, 1920. Serial No. 370,184.

*To all whom it may concern:*

Be it known that I, MAURICE G. OLIVIER, citizen of the French Republic, residing at Paris, France, Department of the Seine, and having post-office address 16 Rue de Louvre, in the said city, have invented certain new and useful Improvements in Methods of Producing Molded Articles of Pure Cellulose; and I do hereby declare the following to be a full, clear, and exact description of the invention, such as will enable others skilled in the art to which it appertains to make and use the same.

Pure cellulose in sheets preferably obtained by coagulating solutions of cellulose, such as viscose for example, has the property of assuming in water sufficient plasticity to enable it to be applied exactly to all parts of a mold. The shrinkage which a sheet of pure cellulose undergoes in drying permits an article of definite shape in perfect reproduction of a mold having besides lightness, transparency and flexibility to be cheaply obtained. By reason of the qualities mentioned pure cellulose can advantageously replace glass for certain purposes. In preparing the pure cellulose in sheets, I use, preferably, solutions of pure cellulose, such as those employed for the manufacture of silk, which give, when treated with certain coagulating agents, cellulose in a first stage of purity, which can be made absolutely pure by washing with certain re-agents. The sheets of cellulose used in the process are in a state of hydration, and in such state are directly obtained by coagulation of solutions of cellulose used ordinarily in the making of artificial silk. On account of the process of drying, said hydrated cellulose is changed into pure cellulose, that is to say, it is not combined with other foreign bodies.

If the molding is carried out on a warm metal the coefficient of expansion of dry cellulose being very much smaller than that of metals, a rapid cooling of the mold permits the sheet of pure molded cellulose to be removed very easily.

As an example of this method the manufacture of a cylindrical box will now be described.

A moistened sheet of pure cellulose is applied to a metal cylinder, sufficient pressure being employed to ensure the sheet touching at all points, and another moistened sheet of pure cellulose is applied under similar conditions to a second metal cylinder, the diameter of which is smaller than that of the first cylinder, differing only by the thickness of the cellulose film. The portion of metal covered by the film does not exceed half the total length of each cylinder. The whole is then dried in a drying room warmed with water bath and ventilated in such a manner that complete dryness of the films is obtained in a very short time, a few minutes for example. The cylinders are then withdrawn from the drying room, and the uncovered metal parts plunged in very cold water. By reason of the contraction of the metal the two coatings of pure dry cellulose, each of which has preserved the diameter of the warm cylinder, are detached from their support. They have acquired a definite shape and by reason of the difference of their diameters can be slipped one inside the other to form a perfectly closed box.

Where it is desired the box should contain a liquid which might soften the cellulose, this is rendered impermeable by one of the numerous processes ordinarily employed.

If the metallic supports or molds are engraved the sheet of pure molded cellulose will reproduce in relief all the details of the engraving and this property is very useful for the purpose of ornament or the application of marks.

These cases can also be obtained with very thin sheets of pure cellulose which may be used for the inside lining of boxes of any other kind, the life of which can thus be increased while preserving the contents from harmful contact with the material of which the container is formed.

Various substances can also be incorporated in the paste which serves for the production of pure cellulose in sheets or can be applied to the sheets in cases where transparency is not desired and for the purpose of producing imitations of other materials, ivory or tortoise-shell for instance.

It will be understood that the invention is not limited to the manufacture of cylindrical boxes, which is given by way of example, but includes the production by the same process of molded articles in pure cellulose of various other forms.

Having now particularly described and ascertained the nature of my said invention and in what manner the same is to be performed, I declare that what I claim is:

1. The method of producing molded articles of pure cellulose which consists in applying a moistened sheet of pure cellulose to a metal core, raising the temperature of the cellulose coated core to a suitable degree in a heated drying room so as to dry the cellulose and expand the core, and thereafter rapidly cooling the core to cause a shrinkage thereof so as to enable the cellulose article to be freely withdrawn therefrom, substantially as described.

2. The method of producing molded articles of pure cellulose which consists in applying a moistened sheet of pure cellulose to a metal core, leaving a substantial portion of the core uncovered, raising the temperature of the cellulose coated core to a suitable degree in a heated drying room so as to dry the cellulose and expand the core, thereafter removing the cellulose coated core from the drying room, and rapidly cooling the same by plunging the uncovered metal parts of said core in cold water so as to enable the cellulose article to be freely withdrawn therefrom, substantially as described.

In testimony whereof I affix my signature.

MAURICE G. OLIVIER.